United States Patent [19]

Katsuro et al.

[11] Patent Number: 6,110,852
[45] Date of Patent: Aug. 29, 2000

[54] PROCESS FOR PRODUCING SYNTHETIC QUARTZ GLASS POWDER

[75] Inventors: Yoshio Katsuro; Hozumi Endo; Akira Utsunomiya; Hiroaki Nagai; Toshifumi Yoshikawa; Shoji Oishi; Takashi Yamaguchi, all of Kitakyushu, Japan

[73] Assignee: Mitsubishi Chemical Corporation, Tokyo, Japan

[21] Appl. No.: 08/849,721

[22] PCT Filed: Dec. 25, 1995

[86] PCT No.: PCT/JP95/02666

§ 371 Date: Nov. 4, 1997

§ 102(e) Date: Nov. 4, 1997

[87] PCT Pub. No.: WO96/20128

PCT Pub. Date: Jul. 4, 1996

[30] Foreign Application Priority Data

| Dec. 26, 1994 | [JP] | Japan | 6-322561 |
| Dec. 26, 1994 | [JP] | Japan | 6-322562 |
| Oct. 27, 1995 | [JP] | Japan | 7-280726 |

[51] Int. Cl.[7] ................................................. C03C 3/06
[52] U.S. Cl. .............................. 501/54; 501/12; 423/325; 423/338
[58] Field of Search .................... 501/12, 54; 423/325, 423/338

[56] References Cited

U.S. PATENT DOCUMENTS

| 3,977,993 | 8/1976 | Lynch | 252/317 |
| 4,979,973 | 12/1990 | Takita et al. | 501/12 |
| 5,021,073 | 6/1991 | Takita et al. | 501/12 |
| 5,028,247 | 7/1991 | Asami et al. | 501/12 |
| 5,141,786 | 8/1992 | Shimizu et al. | 501/12 |
| 5,202,104 | 4/1993 | Watanabe et al. | 423/335 |
| 5,211,733 | 5/1993 | Fukao et al. | 501/12 |
| 5,302,556 | 4/1994 | Shimizu et al. | 501/12 |
| 5,516,350 | 5/1996 | Onoda et al. | 65/17.2 |
| 5,604,163 | 2/1997 | Endo et al. | 501/12 |

FOREIGN PATENT DOCUMENTS

| 4-83711 | 3/1992 | Japan . |
| 4-238808 | 8/1992 | Japan . |

*Primary Examiner*—Karl Group
*Attorney, Agent, or Firm*—Oblon, Spivak, McClelland, Maier & Neustadt, P.C.

[57] ABSTRACT

A process for producing synthetic quartz powder which comprises calcining silica gel powder to produce a synthetic quartz glass powder, wherein dry air is used in the calcining process at least in the process of cooling from 800° C. to 200° C. This process enables efficient production of synthetic quartz glass powder on an industrial scale.

9 Claims, 2 Drawing Sheets

PROCESS FOR PRODUCING SYNTHETIC QUARTZ GLASS POWDER

TECHNICAL FIELD

The present invention relates to a production of a synthetic quartz glass powder of high purity and low silanol content.

BACKGROUND ART

In recent years, glass products used in the industry of optical communication, semiconductors, etc. are under very severe controls with respect to the purity of the constituting glass materials.

To produce such a highly pure glass product, there are mainly the following methods: (1) a method using sand-like natural quartz powder (what is called "sand") obtained by pulverizing natural quartz; to obtain more purified ones, (2) oxygen-hydrogen flame method, a method which comprises using a lump of fume, obtained by adhesion and growth on the substrate, of the fume generated by the hydrolysis of silicon tetrachloride in the oxygen-hydrogen flame; (3) a method whereby an alkoxysilane is hydrolyzed and gelled to obtain a silica gel powder, and then the silica gel powder is calcined to obtain a glass powder, which is then fused and shaped. However, among these methods, method (1) has limit in lowering extremely small amount of impurities content, method (2) has problem of expensive production cost.

Method (3), using silica gel, especially using silicon alkoxide as the starting material, quartz glass with low impurity content can be economically obtained compared to the method (2). However, by this method, silanol groups which the starting material has during the hydrolysis and gelation, will remain as residual silanol groups in the particles after the calcination, whereby, as compared with natural quartz powder, the product has a higher silanol content. If the silanol content is high, the viscosity at a high temperature tends to be low, and such a product is not useful for e.g. a crucible for drawing a silicon single crystal or for a diffusion furnace semiconductors (Japanese Unexamined Patent Publication No. 320232/1989). For such applications, it is said that the silanol content is preferably 100 to 50 ppm.

However, there is also such a problem that lowering residual silanol content to this level is technically difficult in industrial scale, and even when attained, long time calcination is necessary. If lowering of silanol content is not enough, there is also such a problem that the obtained shaped quartz glass product has small bubbles.

To lower the silanol concentration efficiently, there are also the following methods. One comprises calcining silica gel in a gas containing halogen dehydroxy agent such as chlorine(Japanese Unexamined Patent Publication No. 186232/1986). However, by this method, although silanol is efficiently reduced, the halogen atom remains, so the quality of the obtained shaped product cannot be satisfactory.

To reduce silanol content, there are also a method which comprises selecting a low water vapor partial pressure atmosphere for calcination (Japanese Unexamined Patent Publication No. 289416/1990), and a method in which calcination is carried out by introducing dry gas in the silica gel (Japanese Unexamined Patent Publication No. 83711/1992). By the former method, silanol is reduced by a long time calcination, but it can not necessarily shorten the calcination time. Namely, long time calcination is necessary. It is described that the latter method improves the silanol reducing rate, and it is explained that a precipitated silica gel having an average particle size of 120 $\mu$m is used as a starting material, and a gas with low water vapor partial pressure is used, then the silanol content after the calcination can be reduced to no more than 60 ppm. By the former method, for example under high temperature of 1100 to 1250° C., calcination is carried out by introducing a dry gas, and a synthetic quartz glass powder is obtained, then the obtained synthetic quartz glass powder is took out of the furnace and cooled. By such methods, the silanol content in he obtained product is from 60 to 100 ppm.

As described above, in the conventional methods, the attention was paid to the atmospheric moisture at high temperature, especially not less than 800° C. The studies of the present inventors have clarified that, generally at a temperature not lower than 1000° C., there is equilibrium between the silanol content in the silica solid and the water content in the atmosphere (moisture), and that the reversible desorption rate of silanol is fast. Therefore, such a method has been tried as to use dry air during calcination to reduce the silanol content in the synthetic quartz glass powder, as described above.

However, as the present inventors have made an intentional studying, they have found out that, to reduce the silanol content to the aimed value (not more than 50 ppm of silanol content to maintain the high temperature strength in high level and to reduce bubbling in the obtained shaped glass product), surprisingly, water absorbed reversibly upon cooling, namely silanol increase, cannot be neglected. This means that conventionally, more than necessary length of calcination was required, and silanol was reduced to an extreme degree, to compensate the increase of silanol during the cooling.

To lower water to be absorbed upon cooling, to cool quickly from high temperature can be considered, but in such case, quenching causes heat deterioration of the material. In a practical manner, cooling rate applicable to an industrial material (furnace material, crucible, etc.) needs for example at least several hours to cool from about 800 to 200° C., so the increase of silanol cannot be restrained enough.

Next, the present inventors tried the latter method, that is, to introduce dry air in the silica gel powder during the calcination, and followed in an industrial scale (using a quartz container capable of treating several dozens of kilograms to several hundreds of kilograms at once.), but the effect described in the above described bulletin (Japanese Unexamined Patent Publication No. 83711/1992) was not necessarily obtained. The dry air used upon calcination has been considered generally that, the more the flux, the more it increases silanol reduction rate. So, in the above bulletin (Japanese Unexamined Patent Publication No. 83711/1992), it is described that "no less than 3 liter/Hr per 1 kg of silica to be calcined" is introduced, and that in the case when 10 liter/Hr is introduced (Example 2), more silanol content is reduced compared to the case when 2 liter/Hr is introduced (Comparative Example 3). But with the pulverized silica gel with average particle size of 150 to 300$\mu$m, that the present inventors used, such a tendency could not be observed. And the present inventors have found out that, contrary to the conventional idea, calcining carried out under condition using dry gas flux in a specific range of extremely low level, silanol reducing rate increases. Also, they have clarified that, when flux is above this specific range, when the powder is filled up in high level in the container used for calcination, a phenomenon that the treated powder boils over from the container occurs, and the yield is extremely lowered.

Furthermore, it is clarified that, when calcination is carried out actually in an industrial size scale, there is a great unevenness of silanol content in the obtained synthetic quartz glass powder, depending to the place in the container during calcination. For example, it is found out that, filling up silica gel powder for about 80 percent in a heat resistant cylindrical container and calcining for a very long time by introducing dry air, the obtained synthetic quartz glass powder has a silanol content of from 50 ppm to 80 ppm, so there is even 30 ppm of difference according to the place in the container. Trying to lower silanol content evenly, by lengthning the calcination time, or by raising the calcining temperature, a great amount of cost is needed, and furthermore, sintering between particles occurs, and there is inconvenience such that after-process such as crushing after the calcination is needed.

As described above, any of the conventional technics has difficulty to the silanol reduction in an industrial scale, and a method for producing a synthetic quartz glass powder with evenly and low content of silanol was needed.

DESCRIPTION OF THE PRESENT INVENTION

The present inventors have made intensive studies, according to the above mentioned problems. And they have found out that, by reducing the amount of water to be introduced in the product during the cooling process, the aimed low silanol content synthetic quartz glass powder can be obtained, and they attained to the present invention.

Namely, the object of the present invention is to present an excellent process for producing a synthetic quartz glass granule or powder that can maintain very low silanol content, and such an object can be attained, when silica gel powder is calcined to produce an synthetic quartz glass powder, dry air is used in the calcining process especially in the process of cooling from 800° C. to 200° C.

Furthermore, the present inventors conducted further studies, and they found out that, when dry air introduced in the powder is not less than a certain amount, the bubbling phenomenon of the powder occurs in the vicinity of the gas supply tube inserted in the powder layer. They also found out that, the amount of dry air flux range causing such a phenomenon changes largely depending to the location of dry gas outlet and to the particle size of the powder. Here, bubbling phenomenon means, that the powder moves in the powder layer. When such a bubbling phenomenon occurs, there is a part where a solid phase and a gas phase are mixed continuously occurs in a similar way as, a part where a liquid phase and a gas phase are mixed occurs continuously by boiling of a heated liquid, and usually, powder moves violently in the powder layer. Also, such a phenomenon can be observed as powder jumps like popping and dances on the surface of the powder layer. It is found out that, when such a bubbling phenomenon occurs, silanol content increases, and also the powder boils over out of the container.

Figure 1:
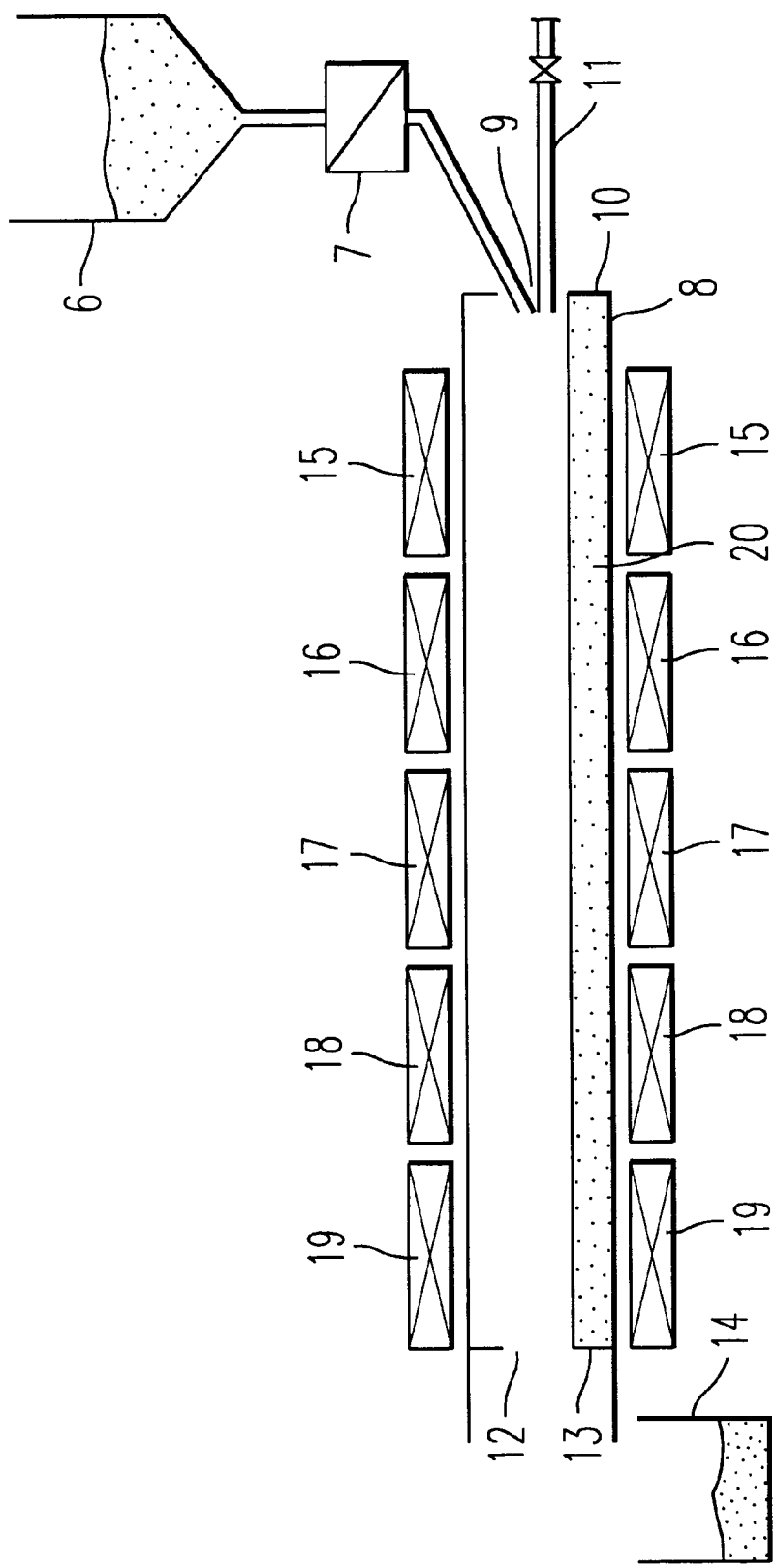
FIG. 1 shows a diagrammatic illustration of a rotary kiln used in the Example 1.

In the figures, 1 is quartz glass tube, 2 is quartz glass crucible, 3 is powder, 4 is electric furnace, 6 is dry gel hopper, 7 is table feeder, 8 is core tube, 9 is supply outlet, 10 is doughnut shaped sheeting at the supply outlet, 11 is air supply tube, 12 is a discharge outlet, 13 is doughnut shaped sheeting at the discharge outlet, 14 is a treated powder receiver, 15 is the first heater, 16 is the second heater, 17 is the third heater, 18 is the fourth heater, 19 is the fifth heater, 20 is dry silica gel powder.

DETAILED DESCRIPTION OF THE PRESENT INVENTION

Now, the present invention will be described in detail.
(Preparation of Silica Gel Powder)

The silica gel powder used in the present invention is not limited. For example, silica sol is prepared by dispersing fumed silica in water, and transforming it into a silica gel, which is a method called colloid dispersion method, and another method that is to hydrolyze some hydrosizable silicon compound such as alkoxysilane, silicic salts, which is called hydrolysis method. As the property of the obtained silica gel is excellent and as it is easy to obtain high purity one by purifying the starting material, hydrolysis method is preferred. Especially the silica gel powder obtained by hydrolysing an alkoxysilane is preferred, as the only byproduct is an alcohol that does not cause any corrosion of the container and that can be easily be removed.

The production of silica gel powder by hydrolysis of an alkoxysilane is carried out by reacting the alkoxysilane and water according to the processes known as sol-gel method.

As starting material, C1-4 lower alkoxysilanes such as tetramethoxysilane, tetraethoxysilane, or their oligomers, are suitably employed, as being easily hydrolyzed and the residual carbon content in the obtained silica gel being low.

The amount of water is selected from the range of 1 to 10 equivalents, preferably 1 to 7 equivalents, to the alkoxy groups in the alkoxysilane. If necessary, an organic solvent such as alcohol or an ether soluble to water may be added. Alcohol usable include low fatty acid group alcohol such as methanol, ethanol. Using these organic solvent, the reaction system can be made uniform and stable.

However, as the hydrolysis proceeds, the alkoxy group bonded to the alkoxysilane will be freed as an alcohol. Therefore, if the reaction can be carried out practically without any trouble even if no alcohol is added.

For the hydrolysis reaction, an acid such as hydrochloric acid or acetic acid, or an alkali such as ammonia, may be employed as a catalyst, but the reaction can also be proceeded without catalyst. As a matter of course, in order to obtain a silica gel powder of high purity, the materials to be introduced to this reaction system, such as the starting material alkoxysilane, water, the catalyst, etc., are all of high purity.

Any of these known process can be employed to obtain a silica gel, but generally it is preferable to obtain a silica gel in a state of a continuous lump and pulverizing it and carry out the following processes, than to obtain a silica gel as precipitate, because of better quality of the obtained synthetic quartz glass powder and high yield as additional process such as separation from supernatant fluid is not needed.

Thus obtained silica gel is made into silica gel powder by means of pulverization for instance, if necessary. Generally the silica gel is dried before the calcination process to be described afterwards. The obtained gel maybe dried after pulverization, or may be pulverized after drying. Pulverization is carried out so that the particle size distribution of the dried silica gel be from 10 to 1000 $\mu$m, preferably from 100 to 600 $\mu$m, and the average particle size be from 150 to 300 $\mu$m.
(Drying)

Drying is carried out by heating under ordinary pressure or reduced pressure. It can also be carried out in an inert gas atmosphere. Temperature depends according to the other conditions, but usually it is from 50 to 200° C., preferably from 100 to 200° C.

Also, the process can be carried out by any of batch process and continuous process. The gel is dried to such an extent that the content of liquid is usually from 1 to 30 wt %.

By drying the gel in such way before calcining, agglomeration of synthetic quartz glass powder after calcining can be prevented, and calcining process also can be conducted efficiently.

For example, wet gel having particle size distribution of from 100 to 500 micron, after methanol and water being removed and dried, is calcined so that carbon and silanol as residual group are removed. Desirable synthetic quartz glass powder as a product has, for example, particle size distribution of from 75 to 400 micron, carbon content of less than 5 ppm and silanol content of no more than 100 ppm.

(Calcination)

The silica gel powder thus dried (called "dry silica gel powder" hereinafter) is then calcined. Calcination is carried out under oxygen containing atmosphere, at least until about 600° C. wherein the removal of carbon remaining in the dry silica gel is nearly completed, but after that, calcination can be carried out under inert gas atmosphere. Also, to reduce silanol content efficiently, it is preferable that the dew point of the atmospheric gas be as low as possible, preferably not over −20° C., more preferably not over −40° C. Calcination is carried out at a temperature not below 1000° C., wherein pore in the gel is closed completely, and not higher than 1300° C. If the temperature is higher than this, it is not favorable because sintering of the particles occurs, and crushing after calcining will be needed.

Calcination of the dry silica gel powder can be carried out directly by heating and closing pore at the temperature within a range of from 1000 to 1300° C., but it is preferable to conduct heat treatment once at a temperature of from 300 to 500° C., and after that, transform it to the synthetic quartz powder. The reason is explained below.

(Heat Treatment at 300 to 500° C.)

Usually, in the dry silica gel obtained as above, unreacted alkoxy group and part of byproduced alcohol are remaining. Actually, carbon content in the silica gel powder measured after drying, though depending on the drying conditions, is about 1 to 3 wt %. Such silica gel powder, when calcined by heating at a temperature of from 1000 to 1300° C. under oxygen containing gas, most of the carbon is removed by burning, but a part of the carbon is confirmed in the synthetic quartz powder as unburned carbon. Using such unburned carbon containing synthetic quartz glass powder, the unburned carbon turns into CO or $CO_2$ gas at the time of fusing and shaping, that causes bubbling. So, it is necessary to remove substantially all of unburned carbon before pores in the silica gel be closed, that is the reason why the temperature raising speed in the course of temperature raising process is important.

However, to industrially produce a synthetic quartz glass powder, container with large volume such as big aperture quartz crucible is generally used for calcination. In such case, there is unevenness of temperature in the crucible during the temperature raising process, so it is difficult to raise temperature at an evenly pattern in every place in the crucible. As the result, by directly heating at a temperature of from 1000 to 1300° C. and closing the pores in the silica gel powder to obtain synthetic quartz glass powder, there are some cases wherein, carbon remains in a part of the obtained synthetic quartz glass powder, and by using such a powder, bubbles can be observed in the obtained shaped product.

On the other hand, the studies of the present inventors show that, residual carbon in the dried silica gel powder is, when touched to the oxygen containing gas at a temperature of no lower than 300° C., decreases, generating CO or $CO_2$, and as the treating temperature raises the reduction rate of carbon content increases. Their studies also clarifies that pore closure of silica gel proceeds steeply at a temperature over 600° C. So, once carrying out heat treatment at 300 to 500° C. so that the residual carbon content decreases to no more than 5000 ppm, preferably no more than 1000 ppm, then heat treatment may be carried out at 1000 to 1300° C. to close the pores in the silica gel powder and obtain a synthetic quartz glass powder.

The treatment time at this temperature, though depending to the treating temperature, is carried out usually from 1 to 10 hours. Heat treatment can be carried out by any of batch process and continuous process. As continuous process, rotary kiln can be used, for instance. Namely, from one end of the core tube of the rotary kiln the dried silica gel powder is supplied, and at the same time heat treatment is carried out in the core tube, and the powder after the treatment is removed from the core tube continuously. In this process, the material of core tube has to be selected so that to prevent contamination to the powder to be treated, so quartz is preferable. When quartz is used as core tube material, as the size of core tube that can be manufactured is limited, heat treatment could be carried out by a multi-stage rotary kiln arranged in series, if needed.

(Heat Treatment in the Crucible)

Then, thus heat treated silica gel powder is furthermore calcined. Namely thus treated silica gel powder is heated at a temperature of from 1000 to 1300° C. where pores are closed, to obtain a synthetic quartz glass powder. Generally the operation is carried out by batch process. It is preferable to use a container of which the material doesn't cause contamination, quartz for instance.

Usually, the calcining temperature is preferably from 1100 to 1300° C. It is not desirable to carry out calcination out of this temperature range, because if the temperature is too low it takes too much time to calcine, and if the temperature is too high the sintering of particles occurs. Calcination time is, although depending to the calcining temperature, usually from 10 to 100 hours. Calcination is continued until the silanol content in the synthetic quartz glass powder is no more than 100 ppm, preferably no more than 60 ppm.

(Bubbling Phenomenon)

Here, it is preferable that the dry gas be introduced by an outlet situated in the silica gel powder layer. As a dry gas, inert gas such as nitrogen or argon, oxygen, air, or mixture of these can be employed. From economical point of view, air is preferable. The gas to be used is passed through a filter for instance, in advance, to remove dust. Also, water in the gas is thoroughly removed by absorption for instance, so that the dew point of the gas be not over −20° C., preferably not over −40° C. It is not desirable that the dew point be higher than this range, because silanol content in the obtained synthetic quartz powder becomes higher. Dry gas is supplied from a tube inserted in the powder layer. The material of the tube is one that doesn't cause impurity contamination, quartz for instance, like the container material. Although the location of the outlet of dry gas is not limited, it is preferable that it is somewhere within half of the height of the powder layer from the bottom of the container. If it is higher than this, silanol reduction rate decreases. Preferably, the flux of dry gas is selected from the range where the powder doesn't show any bubbling phenomenon. If the bubbling phenomenon occurs, although the reason is not very clear, silanol reduction rate decreases, and furthermore, powder boils up from the container.

The bubbling phenomenon occurs when the gas is introduced more than a specific flux. Namely, as the amount of dry gas introduced in the powder increases, discharging pressure of the dry gas increases, and when the amount of dry gas attains to a specific flux, powder soaring over the surface of the powder layer can be observed, and at the same time discharging pressure decreases abruptly. The present inventors found out that this specific flux value changes widely depending on the location of the discharge outlet of dry gas and on particle size of the powder. Namely, the present inventors found out that, this specific flux value (hereinafter "specific value") is in first-order proportion to the distance between the outlet of dry gas and the upper layer, and depends in 1.8 th order on the particle size.

From these results of the experiments, it is considered that, in the above described prior art(Japanese Unexamined Patent Publication No. 83711/1992) using silica gel with average particle size of 125 μm, not only at the Example where flux is big, but also at the Comparative Example where the flux is small, the bubbling phenomenon occurs, and it is estimated that the procedure was carried out under different condition from the present invention namely under the condition that the bubbling phenomenon occurs. Also, the above described prior art uses precipitated silica gel, of which the surface is smooth, so when a big flux is blown through, although the particle behavior shows the bubbling phenomenon, at the same time as the mixing in the system being easy, silanol reduction effect is in some degree achieved.

Compared to such a prior art, selecting dry gas flux from the range where the powder doesn't show any bubbling phenomenon as above described, there is also such an effect that, no matter the shape of silica gel powder, even employing pulverized silica gel, which has poor fluidity, silanol removal is effectively achieved.

Also, when the bubbling phenomenon occurs, powder in the vicinity of the dry gas outlet starts to dance on the powder layer surface, and when the flux is furthermore increased, big bubbles blow up and powder flutters about like bubbles of what is called "blood pond hell", so it is easily confirmed that the bubbling phenomenon is taking place.

Synthetic quartz glass powder with low silanol content can be effectively obtained, by introducing gas of flux no more than this specific value. Also, as there is no boiling up from the container, the synthetic quartz glass powder as product can be obtained substantially quantitatively. However, if the flux of dry gas is extremely low, the effect is decreased. So, it is preferable to carry out calcination by introducing dry gas of at least 10% of the specific value, preferably 20% of the specific value. Also, in the vicinity of the specific value, there is concern that bubbling phenomenon occurs by fluctuation of silica gel size, so, it is preferable to set the upper limit at 95% of the specific value, more preferably at 90% of the specific value.

(Calcination Using Heat Resistant Structural Body)

Also, calcination can be carried out efficiently and uniformly by intruding a structural body with good heat conductance, near the center of dry silica gel being calcined in a heat reasistant container. Structural body to be employed here is not limited as far as it has good heat conductance and is stable under calcining conditions. However it is necessary to have at least heat conductance bigger than that of silica gel powder filled in the container. Ones with heat conductance around 1000° C. of no less than $2 \times 10^{-2}$ mW·m$^{-1}$·k$^{-1}$ are preferably employed. Heat resistant oxides such as alumina and silica glass, silicon-carbide, silicon-nitride, or high temperature-grade SUS or other metals can be employed, for instance. According to the required purity of the quartz glass powder to be obtained, it has to prevent contamination of impurities has to be prevented, and for example for use in semiconductor manufacturing, quartz glass which is the same material as the powder to be treated, or silicon carbide or silicon nitride are preferable. Therefore, it is preferable to use a structural body having the highest heat conductance among those fulfilling the above required purity.

The volume (size) of the heat resistant structural body depends on its heat conductance, preferably nearly from 1 to 40%, more preferably 3 to 25% of the silica gel powder filled in the container. If it is smaller than this, heat transferred to the inner powder is small and the effect to reduce silanol is small. If it is bigger than the above size range, because of decrease of the amount of the powder to be filled in the container, the yield rather decreases, so it is not preferable.

The shape of the said structural body can be simply a cylinder, or a follow cylinder, or it may have several horizontal branch pipes from mid of the trunk to transfer heat efficiently. To ameliorate heat transferring effect, in the case there is only one said structural body, the place to set the said body is, usually around the center. In the case there are plural said bodies, it is preferable to set them keeping interval from each other. In any case it is preferable not to have places where heat is hardly transferred as possible. Especially, the effect is most performed by protruding a part of the structural body from the surface of the filled silica gel powder. Here, heat conductance can be improved by setting plural structural bodies, increasing the number of branch tube, or by complicating the shape of said structural body. But these modes could complicate operation of filling and taking out of the powder and increase possibility of breaking the said structured body, so the number of these bodies is preferably at most several and their shape is preferably as simple as possible. The said structural body can be single or plural, and in the case that plural bodies are used, total volume is preferably in the above range.

(Cooling Process)

According to the present invention, upon cooling after above described calcination, it is necessary to use dry air at least at the range of from 800 to 200° C. The said dry air is an air with dew point under −20° C., preferably dew point of from −40 to −60° C. Lower the dew point is, the silanol content in the silica solid can be reduced better. However, considering the cost of drying the air, dew point below −70° C. is not economical.

As modes to use dry air, there is for example to use dry air as the atmosphere upon cooling the synthetic quartz powder. Needless to say that it doesn't prohibit to use dry air at the temperature above 800° C.

According to the present invention, by controlling the moisture upon cooling, the aimed product described above can be obtained easily.

The synthetic quartz glass powder thus obtained can be suitably used as a starting material for high temperature strength is required various semi-conductor producing fields such as silicon single crystal drawing crucible, diffusion furnace tube and jigs.

Now, the present invention will be described in further detail with reference to Examples.

EXAMPLE 1

Lump wet gel was obtained by reacting high purity tetramethoxysilane with water. By crushing thereby obtained gel with a mesh type pulverizer, and drying it by heating under reduced pressure, powderly dry silica gel was obtained. Then the particle size adjustment was carried out to a particle size of from 100 to 500 μm, by means of vibration sieving machine. The average size of thus obtained silica gel powder (hereinafter "dry silica gel powder") was 250 μm.

(Heat Treatment)

The following heat treatment was carried out by means of a rotary kiln which diagrammatic illustration is shown in FIG. 1.

This rotary kiln has a core tube which material is quartz. Its length (heating zone) is 2 m, the inner diameter is 200 mm, the supply outlet doughnut shaped sheeting has aperture of 40 mm diameter, and the discharge outlet doughnut shaped sheeting has aperture of 40 mm diameter. The core tube is adjusted so that its angle of inclination be 0.5°.

First, each heater was heated to 500° C., and rotating the core tube at a rate of 4 rpm, powderly dry silica gel at the rate of 6.2 kg/Hr, and air at a rate of 4500 liters/Hr, were supplied from the supply outlet. Thus treated powder was discharged from the discharge outlet, and heat treated again by means of a similar rotary kiln, according to the following conditions. The heaters were heated to the following temperature. First heater: 600° C., second heater: 700° C., third heater: 850° C., fourth heater: 1000° C., fifth heater: 1060° C. And by rotating the core tube at a rate of 4 rpm, powder at the rate of 6.5 kg/Hr and air at a rate of 1000 liters/Hr were supplied from the supply outlet, to obtain the powder to be calcined. The powder thus obtained had average particle size of 205 μm.

(Calcination)

Figure 2:
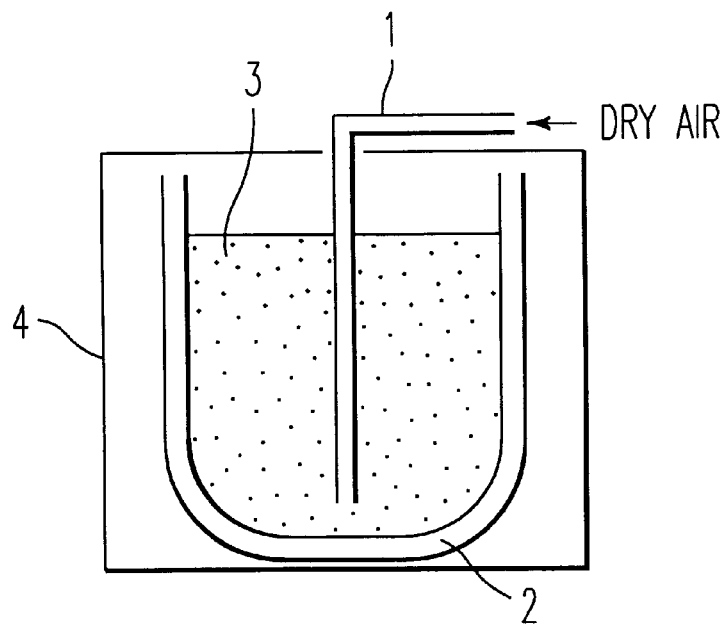
FIG. 2 shows the calcining process of the Example 1.

130 kg of the powder obtained by the above described heat treatment was then charged in a quartz crucible of 550 mmφ×600 mmH. Then, as described in FIG. 2, a quartz glass tube was inserted at the center, and dry air with dew point of −45° C. was supplied at a rate of 6 liters/Hr per 1 kg of powder. During this process no bubbling phenomenon was observed. By continuing to supply the same amount of gas, the temperature was kept at 1200° C. for 60 hours. After calcination, cooling was carried out by supplying dry air. During this process no phenomenon such as the powder boiling over from the crucible was observed. The powder was taken out and mixed by means of a rotational blender. Then small amount of the powder was sampled, and the silanol content measured by means of infrared absorption method was 36 ppm.

EXAMPLE 2

The same operation as Example 1 was carried out except that the calcination temperature was 1150° C. After cacination, no powder boiled up from the crucible was observed. The powder was taken out and mixed by means of a rotational blender. Then small amount of the powder was sampled, and the silanol content measured by means of infrared absorption method was 39 ppm.

Comparative Example 1

The same operation as Example 1 was carried out except that during calcination the dry air was supplied at a rate of 12 liters/Hr. Although no bubbling phenomenon was observed before calcination, 17 kg of powder boiled up was found out of the crucible after calcination. This is considered due to the bubbling phenomenon during calcination. The powder remaining in the crucible was taken out, and mixed by means of a rotational blender. Then small amount of the powder was sampled, and the silanol content measured by means of infrared absorption method was 44 ppm.

Comparative Example 2

The same operation as Example 1 was carried out except that during calcination the dry air was supplied at a rate of 18 liters/Hr. Bubbling phenomenon was observed before calcination, and 59 kg of powder boiled up was found out of the crucible after cacination. This is considered due to the bubbling phenomenon during calcination.

EXAMPLE 3

Figure 3:
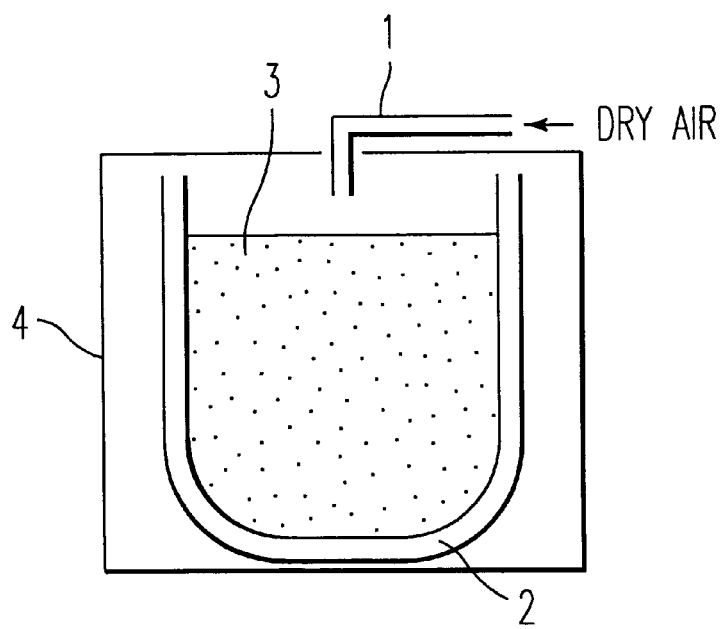
FIG. 3 shows the calcining process of the Example 3.

130 kg of the heat treated powder obtained in Example 1 was charged in a quartz crucible of 550 mmφ×600 mmH. Then, as described in FIG. 3, a quartz glass tube was fixed so that the supply outlet was in the gas phase in the crucible. By supplying dry gas with dew point of −45° C. at a rate of 28 liters/Hr per 1 kg of powder, the temperature was kept at 1200° C. for 60 hours.

After the above described calcination, It was cooled to 200° C. in 5 hours by supplying dry air. Then, supply of dry air was stopped, and it was cooled to room temperature by natural cooling. During this process no phenomenon such as the powder boiling over from the crucible was observed. The powder was taken out and mixed by means of a rotational blender. Then small amount of the powder was sampled, and the silanol content measured by means of infrared absorption method was 45 ppm.

Comparative Example 3

The same operation as Example 3 was carried out except that during cooling process of from 800 to 200° C., an air which was not dried (dew point of 0° C.) was supplied. The silanol content of the powder taken out measured by means of infrared absorption was 80 ppm.

The Effect of the Invention

The present invention enables industrial scale production of synthetic quartz glass powder with low silanol content.

We claim:

1. A process for producing synthetic quartz powder which comprises calcining silica gel powder to produce a synthetic quartz glass powder and then cooling said powder, wherein at least said cooling includes treating said powder with dry air having a dew point of not above −20° C. from 800° C. to 200° C.

2. A process according to claim 1, wherein the silica gel powder is obtained by drying a gel obtained by a sol-gel process.

3. A process according to claim 1 or 2, wherein the dry air has a dew point of not above −40° C.

4. A process according to claim 1, wherein the average particle size of silica gel powder is from 150 to 300 μm.

5. A process according to claim 1, wherein the calcination of silica gel powder is carried out in a heat resistant container containing a layer of said powder, said dry air being supplied from a supply outlet situated in said powder layer, and wherein said dry air is supplied at a flux wherein the powder does not show any bubbling phenomenon.

6. A process according to claim 1, wherein the silica gel powder is obtained by pulverizing a lump silica gel obtained by hydrolysis of tetraalkoxysilane.

7. A process for producing synthetic quartz glass powder which comprises calcining silica gel powder in a heat resistant container containing a layer of said powder, dry air having a dew point of not above −20° C. being supplied from a supply outlet situated in the powder layer, wherein said dry air is supplied at a flux wherein the powder does not show any bubbling phenomenon.

8. A process according to claim 7, wherein silica gel powder is obtained by pulverizing a lump silica gel obtained by hydrolysis of tetraalkoxysilane.

9. A process according to claim 7 or 8, wherein the average particle size of silica gel powder is from 150 to 300 μm.

* * * * *

UNITED STATES PATENT AND TRADEMARK OFFICE
CERTIFICATE OF CORRECTION

PATENT NO. : 6,110,852
DATED : August 29, 2000
INVENTOR(S): Yoshio KATSURO, et al.

It is certified that an error appears in the above-identified patent and that said Letters Patent is hereby corrected as shown below:

On the Title Page, Item [75] the Inventors are incorrectly listed. They should read as follows:

[75] Inventors: Yoshio Katsuro; Hozumi Endo; Akira Utsunomiya; Hiroaki Nagai; Tokifumi Yoshikawa; Shoji Ohishi; Takashi Yamaguchi, all of Kitakyushu, Japan Signed and Sealed this Twenty-ninth Day of May, 2001

*Attest:*

NICHOLAS P. GODICI

*Attesting Officer*   *Acting Director of the United States Patent and Trademark Office*